Dec. 25, 1962  D. F. COLLINS ETAL  3,070,128
CLOSURE CAP FOR TUBE COUPLINGS
Filed June 12, 1959

INVENTORS
DONALD F. COLLINS &
BY FRANK W. COWDRY
John N. Wolfram
ATTORNEY

United States Patent Office 3,070,128
Patented Dec. 25, 1962

3,070,128
CLOSURE CAP FOR TUBE COUPLINGS
Donald F. Collins, Gardena, and Frank W. Cowdrey, Pacific Palisades, Calif., assignors to Parker-Hannifin Corporation, Cleveland, Ohio, a corporation of Ohio
Filed June 12, 1959, Ser. No. 819,977
2 Claims. (Cl. 138—89)

This invention relates to tube couplings and more particularly to caps for closing an end or outlet of a tube coupling when no tube is to be connected thereto.

It is an object of the invention to provide such a closure cap for tube couplings of the flareless type, that is, for coupling tubes which are unflared.

It is another object to provide a closure cap for flareless type tube couplings in which the cap utilizes the nut and sleeve normally used in coupling the unflared tube to the coupling body and in which the cap includes an insert hollow at one end to simulate a tube and is closed at the other end to prevent passage of fluid therethrough.

Figure 1:
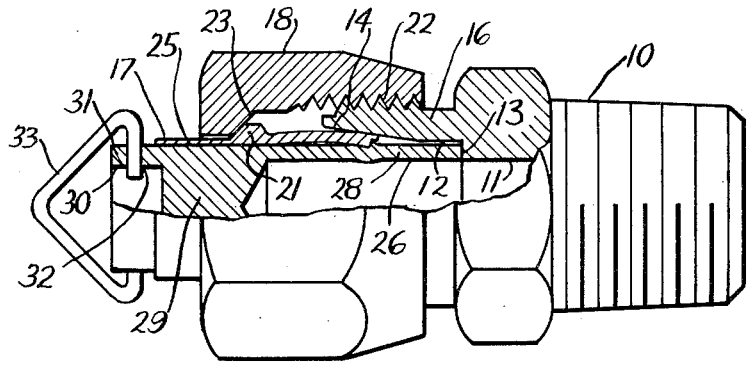

It is another object to provide a cap of the type described in which the cap insert is hollow so that such hollow portion may yield radially to approximately the same degree as a tube under clamping pressure of the sleeve whereby the camming surface of the body which causes contraction of the sleeve into gripping contact with the insert will not be gouged and damaged by the sleeve. Other objects will be apparent from the following description and from the drawings in which:

FIGURE 1 is a longitudinal cross section view of a coupling body with a cap according to the present invention assembled to one of the body outlets for closing the same.

Figure 2:
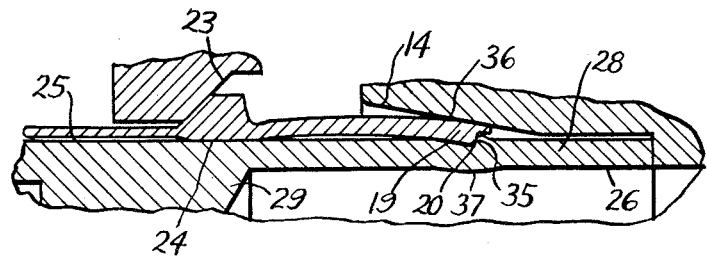

FIGURE 2 is an enlarged fragmentary section showing the sleeve end contracted into gripping engagement with the cap insert. As shown in the drawing, the coupling body 10 has a bore 11 therethrough and a counterbore 12 which normally receives a tube (not shown), the tube end being abutted against body shoulder 13 at the bottom of the counterbore 12. The body also has a tapered mouth 14 leading to the counterbore. Such bore, counterbore, tapered mouth and a surrounding external thread comprise an outlet or inlet port, generally designated 16, at one end of the body.

The cap includes a sleeve 17 and a nut 18, such nut and sleeve preferably being identical to the nut and sleeve used for coupling a tube to the body. The sleeve includes a radially inwardly contractible front end portion 19 having a cutting edge 20, the sleeve also having an abutment shoulder 21 intermediate its ends.

The nut 18 has a threaded connection 22 with the body and has an internal shoulder 23 for engaging the sleeve shoulder 21. These shoulders are preferably tapered so that the sleeve will contract against the insert in this region so that the insert will be firmly clamped at spaced points to prevent cocking or angular deflection of the insert if accidently struck from the side where it projects from the nut and thus cause leakage.

The cap includes an insert 25 whose outside diameter is substantially the same as that of a tube normally to be coupled to the body outlet. The insert has a bore 26 exending inwardly from one end to form a tubular portion 28 whose thickness is substantially the same as the thickness of a tube normally coupled to the body outlet 16.

The insert 25 has an unbored or solid portion 29 and at its outer end has a shallow bore 30 forming a tubular portion 31. The latter has diametrically opposite holes 32, therethrough for receiving a retainer wire clip 33.

As best shown in FIG. 2, when the cap is assembled to the outlet with the tubular portion 28 against the body shoulder 13 and the nut threaded onto the body and the nut is then tightened, the engagement of the nut shoulder 23 with the sleeve shoulder 21 moves the sleeve axially inwardly against the flare mouth 14. The latter causes the front end of the sleeve to contract radially so as to cause the sleeve cutting edge 20 to cut into the tubular portion 26 to form a holding shoulder 35 therein. Pressure between the flare mouth 14 and outer surface 36 at the front end of the sleeve and between the sleeve cutting edge 20 and the insert tubular portion 28 establishes a seal at these locations to prevent leakage of fluid or gas from within the coupling body.

Due to the hollow or tubular construction of the insert 25 in the region where it is gripped by the sleeve cutting edge 20, the tubular portion 28 will yield radially inward to a slight extent as at 37 in an amount comparable to that of a tube such as is normally coupled to the body outlet 16. Such yielding is important since it permits additional forward movement of the sleeve within the flare mouth and distributes the contact pressure with the flare mouth over a larger area so as to prevent gouging of the front end of the sleeve into the surface of the flare mouth 14. Contraction or radial yielding of the tubular portion further reduces the contact pressure between the sleeve end and flare mouth over that obtained when an unbored or solid insert is used and in this manner also helps to avoid gouging of the sleeve end into the flare mouth surface.

Preferably the insert bore 26 terminates at or closely adjacent the solid portion 29 so that there is practically no contraction at the region 24 where the sleeve is contracted against the insert by the nut shoulder 23. This provides a solid, unyielding grip at this point for firmly anchoring the insert against accidental sideward blows. Also an insert bore of such depth insures a substantial length of the tubular portion to be on either side of the point where the latter is gripped by the sleeve end 19 so that the tubular portion will yield radially inward at such point in the same manner as a tube normally coupled to the body 10.

It will be obvious that various detail changes may be made in the parts without departing from the true scope of our invention as hereinafter claimed.

We claim:
1. The combination with a flareless tube coupling of the type wherein a nut and body having screw threaded engagement with each other are operative, when screwed together, to axially advance a sleeve engaged therebetween against a flare mouth in said body to establish a fluid tight seal between the axially inner end of said sleeve and said body and to radially contract said inner end of said sleeve into sealing and gripping engagement with the inner end portion of a tube adapted to be inserted through said nut and sleeve into said body; of an insert extending through said nut and sleeve into said body and having a tubular open inner end portion which is radially inwardly yieldable whereby upon screwing together of said nut and body the inner end of said sleeve is thus radially contracted into sealing and gripping engagement with said tubular portion and the latter is radially contracted by said inner end of said sleeve; said insert having a closed portion axially outwardly spaced from the region thereof gripped by said sleeve whereby fluid under pressure in said body is sealed therein by engagement of said sleeve with said flare mouth and with the tubular end portion of said insert and by the closed portion of said insert.

2. The combination of claim 1 wherein said nut and sleeve have interengaged internal and external shoulders effective, upon screwing together of said nut and body, to radially contract said sleeve into frictional gripping contact with said insert at another region axially outwardly spaced from the contracted inner end of said sleeve; and wherein the closed portion of said insert is within the external shoulder of said sleeve to provide a solid, unyielding backup for firm frictional gripping engagement of said sleeve with said insert at such another region.

References Cited in the file of this patent

UNITED STATES PATENTS

| | | |
|---|---|---|
| 306,527 | Rueter | Oct. 14, 1884 |
| 2,625,955 | Day | Jan. 20, 1953 |
| 2,702,565 | Moritz et al. | Feb. 22, 1955 |
| 2,780,718 | Mullen | Feb. 5, 1957 |